Patented Jan. 1, 1952

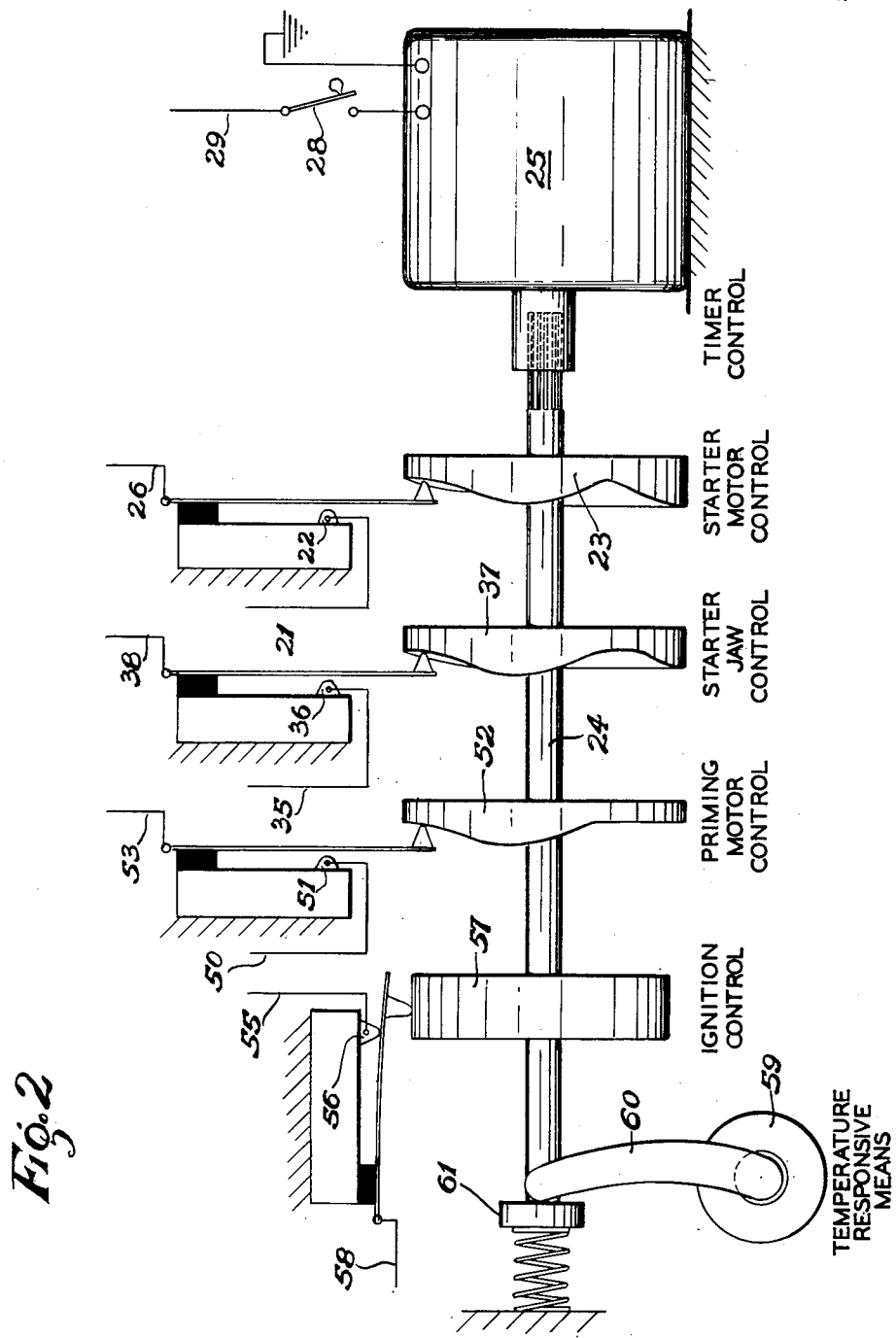

2,580,820

UNITED STATES PATENT OFFICE 2,580,820

AUTOMATIC STARTING CONTROL

Romeo M. Nardone, Teaneck, N. J., assignor to Bendix Aviation Corporation, Teterboro, N. J., a corporation of Delaware Application March 7, 1944, Serial No. 525,418

3 Claims. (Cl. 123—179)

The present invention deals with the starting of internal combustion engines and is concerned more particularly with automatic starting control of aircraft engines.

Under now existing conditions, the starting of an aircraft engine depends on the experience, skill and ability of the operator, as the various operations are initiated manually. Thus, in the case of inexperienced operators, the flywheel is accelerated for an unnecessarily long period with the result of overspeeding and damaging of the electric motor.

The priming of the engine is also under the manual control of the operator and if the engine should be either over-primed or under-primed, the starter is kept energized for an excessive length of time without any effect. As a result motors are often burned out and the complete starter has to be replaced with the resulting loss of time.

With these conditions in mind the invention has in view as an important object, the provision of a control system which renders starting of the engine completely automatic after once initiated by the operator. In carrying out this idea, the invention proposes the use of a timer device which will accomplish the following:

1. Regulate the preliminary cranking and priming period;
2. Accelerate the flywheel for a definite predetermined number of seconds;
3. Turn on the ignition and booster coil at the proper time;
4. Re-engage the starter to crank the engine for a given period; and
5. Automatically reset the timing device for another cycle entirely independent of whether the engine starts or not.

Yet a further object of the invention is the provision of an automatic starting control of the type aforesaid, which includes a thermostat that is responsive to changes in the temperature of the engine and which is operatively connected to the timing device, so that the various periods involved in the cycle may be varied in proper relation to changes in engine temperature.

Various other more detailed objects and advantages of the invention such as arise in connection with carrying out the above noted thoughts in a practical embodiment will in part become apparent, and in part be hereinafter stated as the description of the invention proceeds.

For a full and more complete understanding of the invention, reference may be had to the following description and accompanying drawings, wherein:

Figure 2 is a schematic view illustrating the operation of the several control cams.

Figure 1:
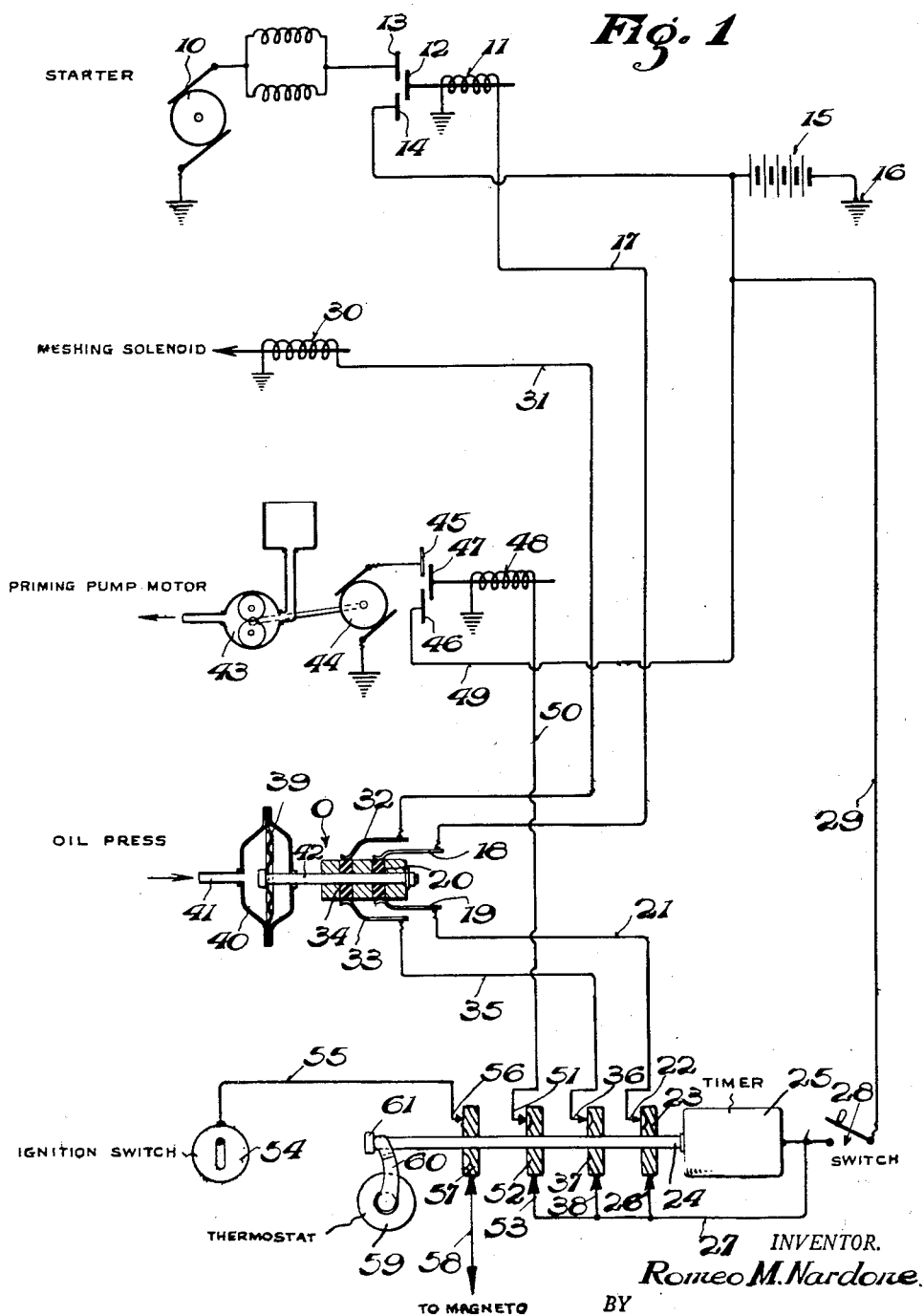
Figure 1 is a diagrammatic representation of an automatic control system designed in accordance with the precepts of this invention.

Referring now to the drawing of Figure 1 a starter is indicated at 10. The starting and stopping of the starter 10 is under the influence of a solenoid switch represented at 11. This switch 11 includes a bridging member 12 which is adapted to complete the circuit across contacts 13 and 14. It will be noted that the contact 14 is directly connected to the usual source of current supply, such as the storage battery indicated at 15. One terminal of the battery 15 is grounded in the conventional manner as depicted at 16.

A conducting line 17 extends from the solenoid switch 11 to a contact element 18, which is included as part of an oil pressure operated switch referred to in its entirety by the reference character O. This switch O embodies another contact member 19 complemental to the contact 18, the two being adapted to be connected by bridging member 20 when the latter is in proper position.

From the contact 19 a line 21 extends to a cam contact represented diagrammatically at 22. The latter engages a cam 23 which is drivably mounted on a shaft 24, that is in effect the drive shaft of a timing motor 25. The cam 23 is electrically connected by line 26 with a lead line 27 that extends to a main control switch depicted at 28. One side of the control switch 28 is connected to the battery 15 by a line 29.

A solenoid, which is intended to control the meshing and de-meshing of the starter jaw, which is either connected or disconnected to the engine crank-shaft, is represented at 30. A line 31 connects the solenoid 30 with another contact 32 of the oil operated switch O. The latter also includes a contact 33 complemental to the contact 32, and which is adapted to be electrically connected therewith by a bridging element 34 when the latter is in proper position.

A line 35 extends from the contact 33 to a cam contact indicated at 36. The latter cooperates with a cam 37 which is also drivably mounted on the shaft 24. Another line 38 serves to electrically connect the cam 37 with the lead line 27.

At this point, it is well to note that the oil pressure switch O includes a diaphragm 39 that is mounted within a diaphragm chamber 40, in a well known manner. A conduit 41 extends to the oil system of the engine which is to be started. A plunger 42 has one end secured to the diaphragm 39 and carries the bridging members 29 and 34 which are spaced by insulation in a well known manner. Thus, when the insulation is disposed between the contacts 18 and 19 and 32 and 33, the respective circuits are open, but when the bridging elements 29 and 34 are placed across their respective contacts, the circuits are closed.

A priming pump is represented at 43 and is shown as being driven by a motor 44. This motor is controlled by a switch comprising contacts 45 and 46 which are adapted to be bridged by a switch element 47. The latter is operated under the influence of a solenoid 48. A line 49 connects the contact 46 with the battery 15.

Another line 50 connects the solenoid 48 with a cam contact 51. The latter engages a cam 52 drivably mounted on the shaft 24. Cam 52 is in turn connected by line 53 with the lead line 27.

An ignition switch is shown at 54, and a line 55 extends from this switch to a cam contact 56. The latter engages a cam 57, which is electrically connected to the magneto of the internal combustion engine, as indicated at 58.

A thermostat is represented diagrammatically at 59, and extending therefrom is an operating arm 60 which operatively engages a head 61 on the shaft 24. The shaft 24 has a suitable splined connection with the drive shaft of the timer motor 25 so that the shaft 24 may be longitudinally adjusted in relation to the motor 25. The head 61 of the shaft 24 may be biased into engagement with the operating arm 60 by suitable spring means. Thus upon movement of the arm 60, longitudinal movement is imparted to the shaft 24.

The cams 23, 37, 52 and 57 as shown in Figure 2, are fixedly mounted on the shaft 24 and the same have provided variable cam surfaces arranged so as to operatively control the switches 22, 36, 51 and 56. The surfaces of the cams 23, 37 and 52 are suitably laterally inclined so that by longitudinal adjustment of the shaft 24, the position and moment at which the cams 23, 37 and 52 will open and close the respective switches 22, 36 and 51 controlled thereby, may be adjusted in accordance with temperature through operation of the arm 60. The cams 23, 37, 52 and 57 driven by the output shaft 24 of the timer motor 25, may actuate microswitches, switchettes or similar quick acting switches well known in the art and controlling the contacts 22, 36, 51 and 56. The thermostat 59 is appropriately located to be responsive to variations in the temperature of the engine. As this temperature changes, the arm 60 will be affected to cause movement of the shaft 24 and thus vary the cam surfaces which are effective on the contacts 22, 36 and 51.

It is not thought necessary to here illustrate or describe the particular construction of the various instrumentalities employed, as all of these are individually well known and they could be readily constructed to serve the particular purpose required.

When the engine is to be started, the operator first turns on the ignition switch at 54 and then closes the main control switch 28. This starts the timer motor 25 into operation, which operation will continue through a prescribed cycle whether the engine starts or not.

Substantially coincident with starting of the timer motor 25, the ignition circuit is opened between the cam contact 56 and the cam 57 of Figure 1 or as shown in Figure 2 between a switch arm and contact 56. At the same time several circuits are completed: First, the circuit to the solenoid switch 11 through contact 22 which controls the starter, the circuit to the solenoid 30 through contact 36 which controls the meshing jaw, and the circuit to the solenoid 48 of the switch of the priming motor through contact 51.

It is well to note that with the engine idle there is no oil pressure and the oil pressure switch O is in position completing the circuits across contacts 18 and 19 and 32 and 33. Thus, the engine will be driven and primed for a prescribed period. The length of this period will depend on the voltage across the timer motor. If this voltage should be low, as in the case of a partially discharged battery, the timing motor speed is decreased and a longer cranking period results.

However, this is not objectionable as the starter cranking and accelerating speed is also correspondingly curtailed. A low battery necessitates a longer accelerating period for proper flywheel speed which will automatically result due to the decreased timer speed.

At the end of this initial priming period, all the circuits are opened by their respective cams for a proper interval, say two or three seconds, during which the starter jaw may be retracted if necessary out of mesh with the engine jaw.

The circuit to the solenoid switch 11 is then again completed to bring the starter 10 into operation and accelerate the starter flywheel for a predetermined period. As this takes place, cam 57 completes the ignition circuit which remains on thereafter.

Upon completion of the accelerating period, the cam 37 completes the circuit to the meshing solenoid 30. Thus, the starter is connected to the engine crank-shaft and this cranking will be continued through a prescribed period unless the engine starts. If the engine does not start, the cycle of the timer motor is completed, whereupon it goes back to neutral or repeat position. The operator can then again operate the switch 28 and initiate another cycle.

However, if the engine starts during the cranking period as intended, the engine oil pressure builds up and acts on the oil switch O to break the circuits to the starter motor and the jaw meshing solenoid. Even though these circuits are broken the timer completes its cycle and returns to its neutral or reset position. In this new position the ignition circuit is completed, as above indicated.

If during flight of the aircraft the oil pressure should fail, the circuits across the contacts 18 and 19 and 32 and 33 would be closed, but since these circuits are opened at cams 23 and 37, nothing happens.

The thermostat 59 will be responsive to changes in the temperature of the engine. Thus, the shaft 24 will be affected to render effective the proper cam surfaces of the cams 23, 37 and 52 so as to vary in accordance with the temperature condition of the engine the length of the acceleration of the starter flywheel controlled by cam 23, the period of engagement of the starter to the engine crank-shaft controlled by cam 37 and the period of operation of the priming pump motor 44 controlled by the cam 52. As will be radially apparent, the required period of operation of these mechanisms will be relatively shorter under high engine temperature conditions than under low engine temperature conditions. It is evident, therefore, that the length of the various intervals may be readily suited to the temperature of the engine by the operation of the engine temperature responsive means 59.

While only one embodiment of the invention is hereinbefore set forth, it is to be clearly understood that the invention is not to be limited to the exact construction illustrated and described, because various modifications of these details may be provided in putting the invention into practice within the purview of the appended claims.

What is claimed is:

1. In a starter mechanism control system, a starter, clutch jaw controlling mechanism, priming mechanism, an ignition circuit for the engine to be started, a timer motor, a shaft driven by said timer motor, cam contacts carried by said shaft for rendering said circuit and mechanisms effective in a predetermined synchronous relation, a thermostat responsive to variations in the temperature of the engine to be started, and means for operatively connecting said thermostat to said cam contacts whereby the period of operation of at least one of said mechanisms may be varied in accordance with changes of temperature at the engine to be started.

2. In an automatic starter control system, starter means, clutch jaw actuating means, engine priming means, a timer motor for causing operation of each of said means to take place during a prescribed period, and thermostatic means responsive to variations in the temperature in the engine to be started to vary the period of operation of each of said means.

3. In an automatic starter control system, starter means, clutch jaw actuating means, engine priming means, a timer motor, a shaft driven by said timer motor, a plurality of cam contacts mounted on said shaft, there being a cam for each of said starter means, said clutch jaw actuating means, and said priming means, respectively, a thermostat responsive to variations in the temperature in the engine to be started, and means to operatively connect said thermostat to said cams.

ROMEO M. NARDONE.

REFERENCES CITED

The following references are of record in the file of this patent:

UNITED STATES PATENTS

| Number | Name | Date |
|---|---|---|
| 1,202,622 | Van Horn | Oct. 24, 1916 |
| 1,406,731 | Heard | Feb. 14, 1922 |
| 1,470,948 | Van Horn | Oct. 16, 1923 |
| 1,650,524 | Kettering | Nov. 22, 1927 |
| 1,706,119 | Jones | Mar. 19, 1929 |
| 2,015,309 | Igarashi | Sept. 23, 1935 |
| 2,518,712 | Owens | Aug. 15, 1950 |